(12) United States Patent
Miller et al.

(10) Patent No.: US 7,209,445 B2
(45) Date of Patent: *Apr. 24, 2007

(54) METHOD AND SYSTEM FOR EXTENDING THE REACH OF A DATA COMMUNICATION CHANNEL USING A FLOW CONTROL INTERCEPTION DEVICE

(75) Inventors: Pierre Miller, Hull (CA); Bernard Merchand, Cantley (CA); Marc W. Leclair, Gatineau (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/061,405

(22) Filed: Feb. 18, 2005

(65) Prior Publication Data

US 2005/0157648 A1    Jul. 21, 2005

Related U.S. Application Data

(63) Continuation of application No. 10/379,611, filed on Mar. 5, 2003, now Pat. No. 6,859,437.

(60) Provisional application No. 60/423,904, filed on Nov. 5, 2002.

(51) Int. Cl.
*G01R 31/08* (2006.01)
*G06F 11/00* (2006.01)
*G08C 15/00* (2006.01)
*H04J 1/16* (2006.01)
*H04L 1/00* (2006.01)

(52) U.S. Cl. .............. 370/235; 375/152; 375/343; 365/189.05; 365/185.17; 365/185.22; 370/342

(58) Field of Classification Search .............. 370/229, 370/230, 235, 235.1, 414, 426, 538, 539, 370/540, 231, 413, 342; 709/200; 375/152, 375/343; 365/189, 185
See application file for complete search history.

(56) References Cited

U.S. PATENT DOCUMENTS 5,436,891 A * 7/1995 Grossman et al. .......... 370/231

(Continued)

FOREIGN PATENT DOCUMENTS

CA        2301433 A1 *  2/2001

OTHER PUBLICATIONS

Tan Pek-Yew and Cheng Hong Micro-flow control framework for home gateway. Retrieved online Jan. 19, 2007.*

*Primary Examiner*—James A Reagan
(74) *Attorney, Agent, or Firm*—John C. Gorecki

(57) ABSTRACT

A system and method for extending the reach of a data communication channel using flow control interception devices is described. The method decreases the latency-induced reduction in the data throughput and permits data transmission at subrates through the data communication channel. The method includes transmitting a data frame from a sending device. The data frame is transmitted through the data communication channel if a flow control signal is not asserted. The data frame is buffered if the flow control signal is asserted. The buffered data frame is transmitted through the data communication channel in response the flow control signal changing to an asserted state. The method also includes receiving the transmitted data frame from the data communication channel and transmitting the received data frame to a receiving device if the receiving device is available to process the data frame. If the receiving device is unavailable, the received data frame is buffered until the receiving device becomes available to process the buffered data frame.

22 Claims, 14 Drawing Sheets

U.S. PATENT DOCUMENTS

| | | | |
|---|---|---|---|
| 5,493,566 A * | 2/1996 | Ljungberg et al. | 370/231 |
| 6,003,064 A * | 12/1999 | Wicki et al. | 709/200 |
| 6,031,843 A * | 2/2000 | Swanbery et al. | 370/426 |
| 6,151,300 A * | 11/2000 | Hunt et al. | 370/231 |
| 6,252,849 B1 * | 6/2001 | Rom et al. | 370/230 |
| 6,295,281 B1 * | 9/2001 | Itkowsky et al. | 370/229 |
| 6,327,253 B1 * | 12/2001 | Frink | 370/231 |
| 6,532,212 B1 * | 3/2003 | Soloway et al. | 370/230 |
| 6,633,585 B1 * | 10/2003 | Ghanwani et al. | 370/235 |
| 6,667,985 B1 * | 12/2003 | Drummond-Murray | 370/235.1 |

* cited by examiner

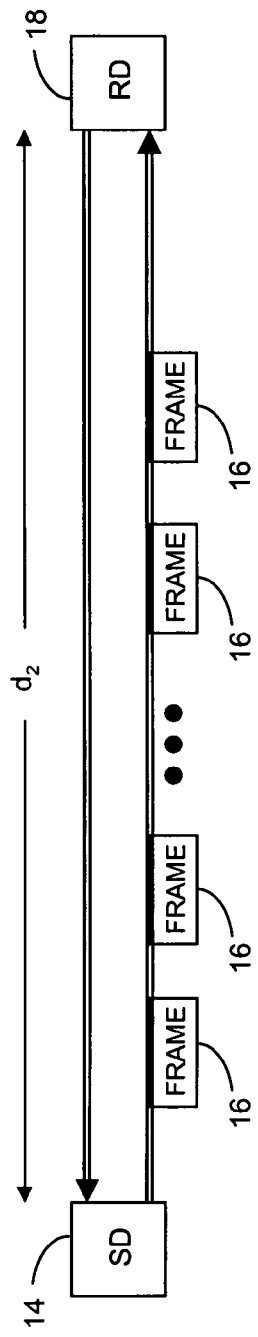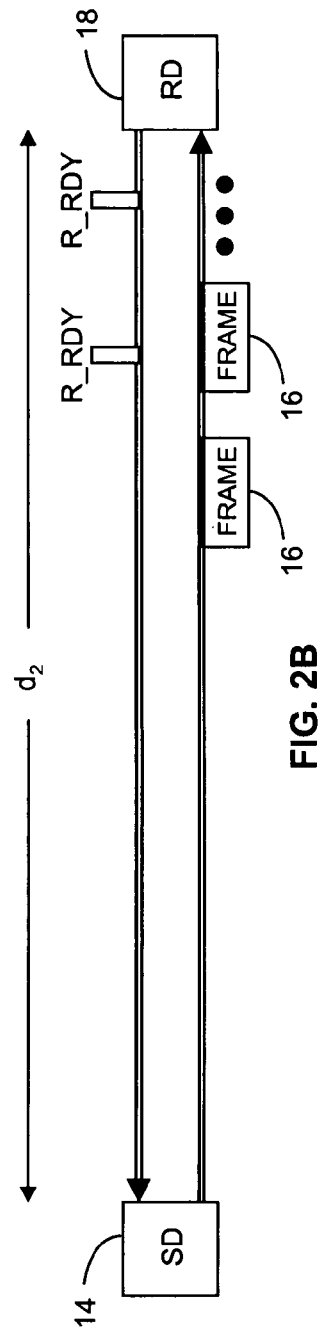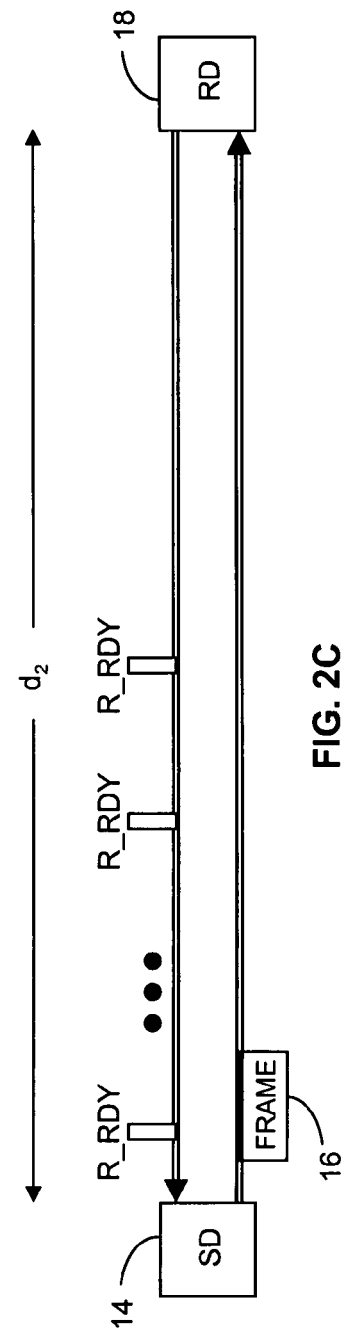

METHOD AND SYSTEM FOR EXTENDING THE REACH OF A DATA COMMUNICATION CHANNEL USING A FLOW CONTROL INTERCEPTION DEVICE

FIELD OF THE INVENTION

The present invention relates to fiber optic communication systems and more particularly to a system and method of extending the reach of a Fiber Channel system over a Synchronous Optical Network (SONET)/Synchronous Digital Hierarchy (SDH) Network, utilizing a flow control interception mechanism.

CROSS-REFERENCE TO RELATED APPLICATIONS

This application claims priority to U.S. patent application Ser. No. 60/423,904, filed Nov. 5, 2002, entitled "Method and System for Extending the Reach of a Fiber Channel Using a Flow Control Interception Mechanism", and also claims priority to U.S. patent application Ser. No. 10/379,611, filed Mar. 5, 2003 now U.S. Pat. No. 6,859,437, entitled "Method And System For Extending The Reach Of A Data Communication Channel Using A Flow Control Interception Device" the content of each of which are hereby incorporated herein by reference.

BACKGROUND OF THE INVENTION

Throughout the 1990s and into this century, the need for high-performance communications for server-to-storage and server-to-server networking has garnered much attention in the communications industry. Performance improvements in storage, processors and workstations, along with the move to distributed architectures such as client/server, have spawned increasingly data-intensive and high-speed networking applications.

Fiber Channel is a serial data transfer architecture standardized according to the American National Standards Institute (ANSI) Standard ANSI X3.230. Fiber Channel accommodates the fast transfer of large volumes of data between desktop workstations, mass storage subsystems, peripherals and host systems within a campus sized area. Fiber Channel offers a standard interface capable of simultaneously supporting both network and channel connections using multiple data communication protocols and is able to provide a number of benefits over traditional small computer system interface (SCSI) communications. For example, Fiber Channel permits faster speed, up to 10 to 250 times faster than typical local area network (LAN) speeds. In addition, Fiber Channel permits the connection of more devices and allows connections between devices over large distances. Fiber Channel has made the largest impact in the storage arena, using SCSI as an upper layer protocol. Further, Fiber Channel supports multiple data rates, media types and connectors while combining channel attributes with those of a LAN to provide a single interface capable of supporting both channel and network connections.

Channel and network protocols typically rely on buffers to hold transmitted and received data. The Fiber Channel protocol accommodates the transfer of data between the sending buffer at the source device (e.g., a computer or disk array) and the receiving buffer at the destination device. Moreover, the Fiber Channel protocol is not dependent on individual protocols implemented prior to receipt into or transmission from the buffers.

Flow control is an important aspect of Fiber Channel communications. Flow control refers to the management of data exchanges between two devices in a network to avoid data transmission loss upon congestion. If a device receives data faster than the device can process the data, data may be dropped or ignored. Similarly, data is lost if the storage capacity of the receiving device is not sufficient to accommodate the received data.

Utilizing flow control, a sending device transmits data to a receiving device only when the receiving device is ready to accept the data. Prior to sending the data, the communicating devices are initialized with respect to each other. This initialization includes the establishment of buffer-to-buffer credits (BBCs). The number of BBCs represents the number of data packets (e.g., frames) a sending device can transmit at one time without receiving an acknowledgement from the receiving device that the receiving device is available to receive at least one additional data packet. The BBC value is provided by the receiving device to the sending device during initialization. If each device has the capability to send data and receive data, a single BBC value is established for both devices. For example, the first device can indicate that it will accept up to four frames from the second device and the second device can indicate that it will accept up to eight frames from A. If determined independently, the BBC value of the first device would be eight and the BBC value of the second device would be four. However, the Fiber Channel protocol requires that both devices be assigned the lower BBC value of four. After enough data are transmitted from a device so that its BBC value is reached, no additional data are transmitted from that device. Data transmission from the sending device resumes when the receiving device indicates that it is ready to receive additional data, such as when the receiving device has processed at least a portion of the received data or buffer storage is again available. This procedure prevents receiver buffer overflow, thus avoiding loss of data.

Each device monitors the use of the available credits. The number of used credits (BBC_Credit_CNT) is initialized at zero prior to the initial transfer of frames between devices. BBC_Credit_CNT is incremented by one each time a frame is sent. Thus the number of remaining credits, representing the number of frames that can be sent to the other device without acknowledgement, is reduced by one. If BBC_Credit_CNT is greater than zero, BBC_Credit_CNT is decremented by 1 for each receiver ready primitive signal (R_RDY signal) received from the receiving device. Transmission of an R_RDY signal indicates the receiving device has processed a frame, made available a receive buffer and is ready to receive an additional frame. If BBC_Credit_CNT increases to equal BBC, the sending device is not allowed to transmit another frame until it receives an R_RDY signal.

Fiber Channel networks are inherently limited by latency. Latency is the transmission time for a data packet or signal to propagate between two nodes in a network. The latency generally increases as the distance between the nodes increases. In a SONET network, each kilometer of channel distance adds approximately 5 microseconds of transmission latency corresponding to the time for an optical pulse to travel through an optical channel between the two nodes.

FIG. 1 is a block diagram illustrating a Fiber Channel communication channel 10 in which a sending device 14 is transmitting data frames 16 to a receiving device 18. Each frame 16 received at the receiving device is buffered, if necessary, and an R_RDY signal is transmitted back to the sending device 14 when the frame 16 is transferred out of the buffer. Because the distance between the sending device 14 and the receiving device 18 is small in this example, the latency is insignificant and the data transmission rate (throughput) of the channel 10 is unaffected.

If the distance between the devices 14, 18 is sufficiently large, the latency reduces the average data transmission rate of the channel 10. FIGS. 2A to 2C illustrate the transmission of frames of data over a channel at three different times. The sending device 14 and the receiving device 18 are separated by a distance $d_2$ substantially greater than the separation illustrated in FIG. 1. In FIG. 2A, data frames 16 (only four shown for clarity) are transmitted from the sending device 14 until its BBC_Credit_CNT equals its BBC value. At a later time as illustrated in FIG. 2B, the sending device 14 waits to receive an R_RDY signal from the receiving device 18 before sending its next frame 16. The receiving device 18 transmits an R_RDY signal back to the sending device 14 as each frame 16 is cleared from the buffer of the receiving device 18. Because of the length $d_2$ of the separation, the sending device 14 continues to wait for the R_RDY signal even though the receiving device 18 has transmitted R_RDY signals and is available to receive additional frames. In FIG. 2C, the sending device 14 begins to receive the group of R_RDY signals and, therefore, resumes transmission of data frames 16. As a result of the propagation delay of the data frames and R_RDY signals, the data throughput is interrupted. The duration of the interruptions increases as the separation $d_2$ of the devices 14, 18 increases.

The interruption, or "downtime", resulting from latency is unacceptable in many types of networks including, for example, Storage Area Networks (SANs). If the distance between the two devices 14, 18 is sufficiently large as illustrated in FIGS. 2A to 2C, the maximum throughput possible without latency cannot be realized. The achievable throughput T is defined as $$T = \frac{BBC * FS}{RT}$$

in which FS is the frame size in bits and RT is the round trip transmission time (i.e., round trip delay). A frame size of 2148 bytes i.e., a maximum transmission unit (MTU) for a Fiber Channel link, takes approximately 20 microseconds to transmit, which represents a distance of 4 km, or 2 km round-trip. Thus each BBC allows approximately 2 km of channel distance $d_2$ without degrading the data throughput.

FIGS. 3 and 4 depict the relationship between throughput rate and channel length for a range of BBC values. The frame size is 2148 bytes. The BBC values are indicated in the legend in the upper right portion of the figures. The horizontal axis represents the length of the channel in kilometers and the vertical axis represents the throughput of the channel in Mb/s. If the BBC value is small (FIG. 3), the achievable throughput for the channel is substantially less than the maximum possible throughput for channel lengths exceeding a few kilometers. For example, for a BBC value of four, the achievable throughput is less than maximum possible throughput if the channel length is greater than 8 km. Larger BBC values (FIG. 4) allow greater channel lengths without a reduction in the throughput. For example, for a BBC value of 64, the achievable throughput is less than maximum possible throughput for channel lengths exceeding approximately 130 km. Thus the impact of latency on the data throughput is reduced by increasing the BBC values for the devices. This capacity increase, however, results in a significant increase in the cost of each device.

It is therefore desirable to provide a system and method for flow control in a Fiber Channel network that avoids unwanted delay time in data frame transmission without creating channel congestion, thereby extending the reach (i.e., the distance over which high data transfer rates can be maintained) of the data communication channel.

SUMMARY OF THE INVENTION

In one aspect, the invention features a system for controlling data communications in a data communication network. The system includes a data communication channel, a sending device port, a receiving device port and a flow control interception device. The sending device port is disposed adjacent to one end of the data communication channel and transmits a plurality of data frames. The receiving device port is disposed adjacent to the other end of the data communication channel and receives the data frames. The flow control interception device is disposed along the data communication channel between the sending device port and the receiving device port. The flow control interception device is adapted to control the transmission of the data frames in response to a control signal. In one embodiment, the flow control interception device comprises an ingress flow control interception device disposed between the sending device port and the one end of the data communication channel. In another embodiment, the flow control interception device comprises an egress flow control interception device disposed between the receiving device port and the other end of the data communication channel. In yet another embodiment, the data communication channel is a Fiber Channel communication channel. In still another embodiment, the data communication channel comprises a portion of a SONET/SDH network.

In another aspect, the invention features a method for extending the reach of a data communication channel and providing subrate data transfer. The method includes transmitting a data frame from a sending device, transmitting the data frame through the data communication channel if a flow control signal is in a first state, buffering the data frame if the flow control signal is in a second state, and transmitting the buffered data frame through the data communication channel in response to a flow control signal in the first state. In one embodiment, the method further comprises receiving the data frame transmitted through the data channel, transmitting the received data frame to a receiving device if the receiving device is available to process the data frame, and buffering the received data frame if the receiving device is unavailable to process the data frame. In a further embodiment, the method also includes transmitting the buffered data frame if the receiving device becomes available to process the buffered data frame. In another embodiment, the method further comprises generating the flow control signal in the second state if a quantity of buffered data frames exceeds a predetermined value and generating the flow control signal in the first state if the quantity of buffered data frames does not exceed the predetermined value. In one embodiment, the flow control signal is a pause timer. In another embodiment, the flow control signal comprises a repetitively generated signal in which each repetition of the repetitively generated signal is in the first state or the second state.

In another aspect, the invention features a method for extending the reach of a data communication channel and providing subrate data transfer. The data communication channel includes an ingress flow control interception device and an egress flow control interception device. The method includes transmitting a data frame from a sending device to the ingress flow control interception device, transmitting the data frame through the data communication channel from the ingress flow control interception device to the egress flow control interception device, transmitting a first receiver ready primitive signal to the sending device in response to the transmission of the data frame through the data communication channel, and transmitting the data frame from the egress flow control interception device to a receiving device. In one embodiment, the method further includes transmitting a second receiver ready primitive signal to the egress flow control device to indicate the availability of the receiving device to receive another data frame.

In another aspect, the invention features a flow control interception device for providing the transfer of data at a subrate. The flow control interception device includes an ingress buffer to store a portion of data received from a sending device transmitting at a first data rate and to transmit the received data through the data communication channel at a second data rate. The first data rate exceeds the second data rate. In one embodiment, the ingress buffer has a capacity that is equal to or greater than the buffer-to-buffer credit value defined between the sending device and a receiving device.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

FIG. 2 is a block diagram illustrating interruptions in data transmission using conventional flow control mechanisms in a Fiber Channel communication channel over long distances;

DETAILED DESCRIPTION OF THE INVENTION

The latency inherent in a communication channel can limit the data throughput of a communications network. To avoid this decrease in data throughput, the length of the communication channel is necessarily limited. In brief overview, the present invention provides a method and system for controlling the flow of data within the channel to reduce or eliminate latency-induced throughput reduction. Consequently, the reach of the communication channel is extended.

Figure 1:
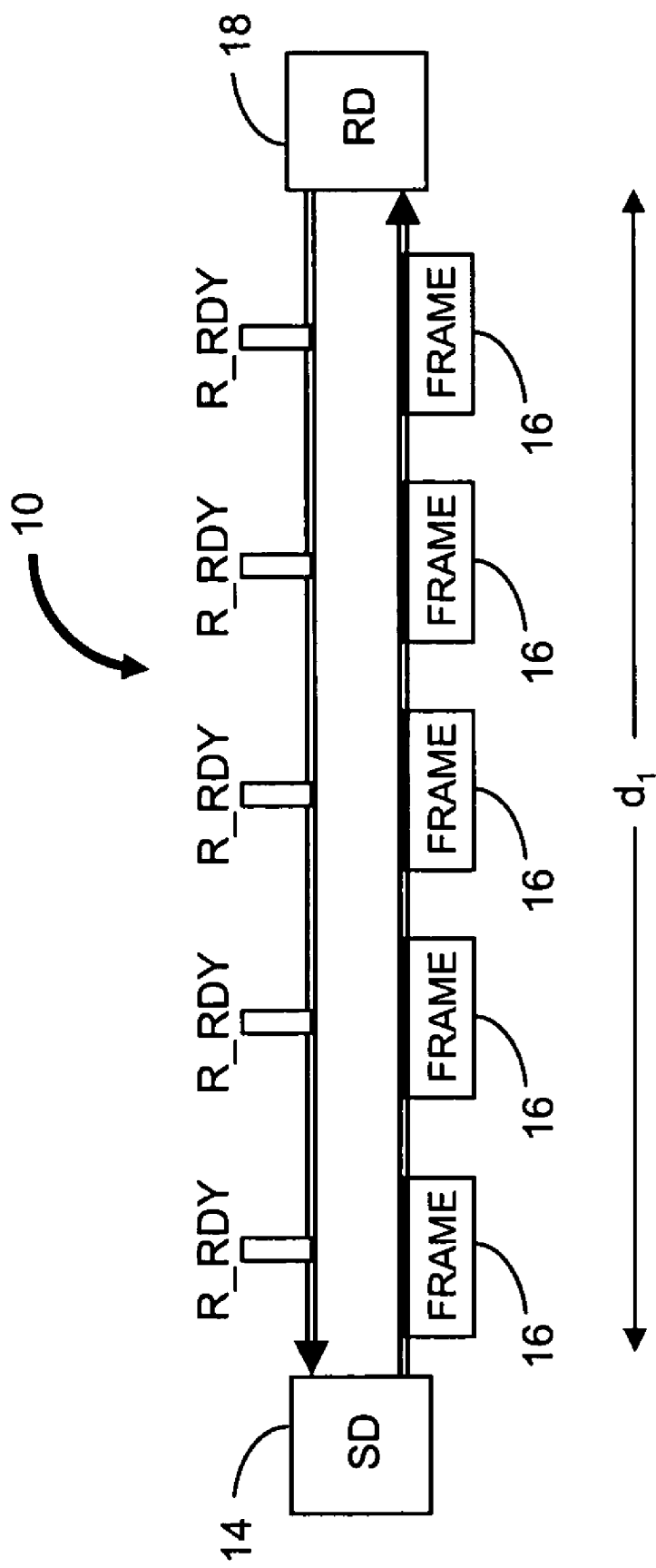
FIG. 1 is a block diagram illustrating continuous rate transmission in a Fiber Channel communication channel.
Figure 3:
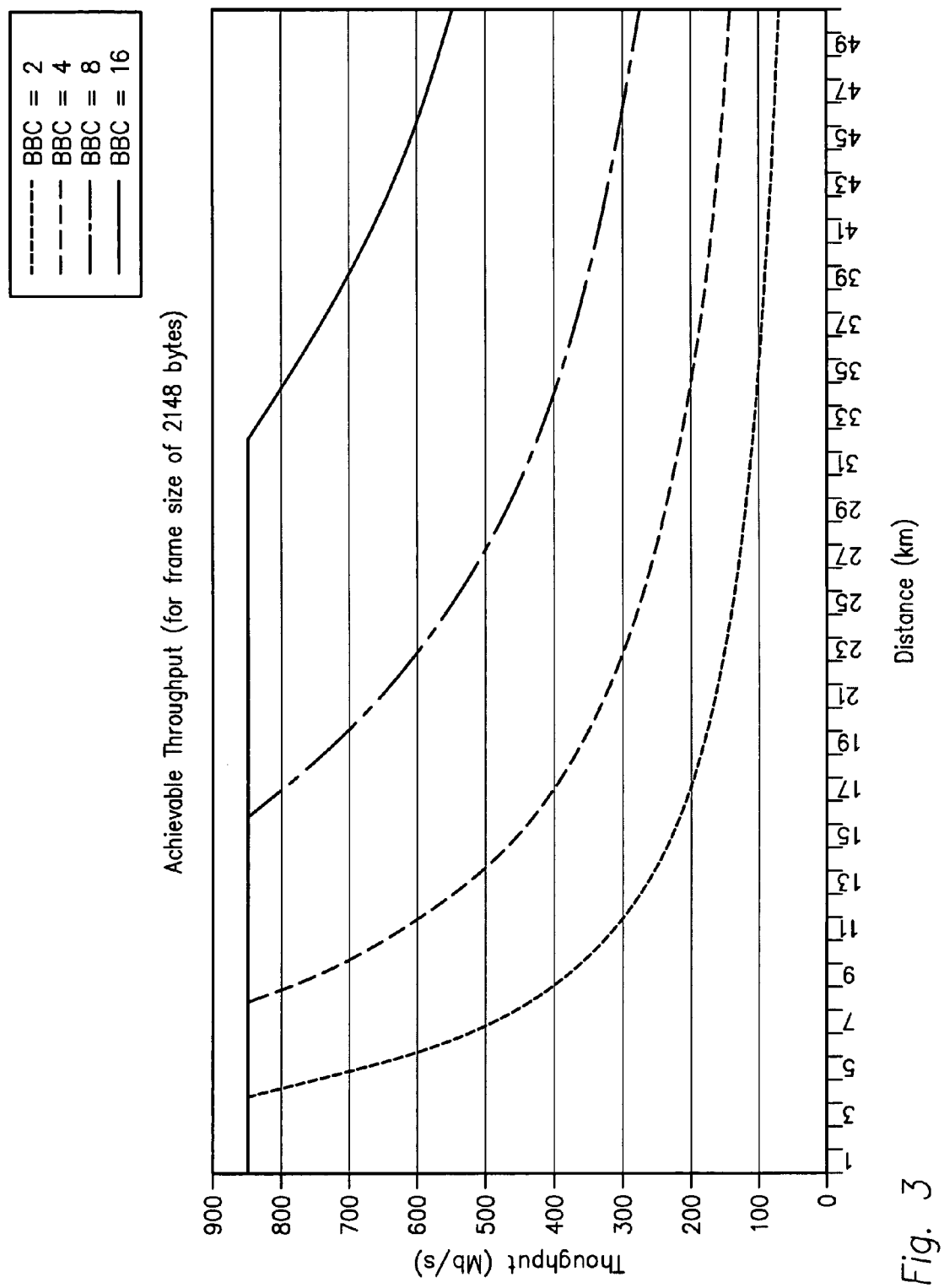
FIG. 3 is a graphical representation of achievable data throughput as a function of channel length and buffer to buffer credits for a conventional Fiber Channel communication channel.
Figure 4:
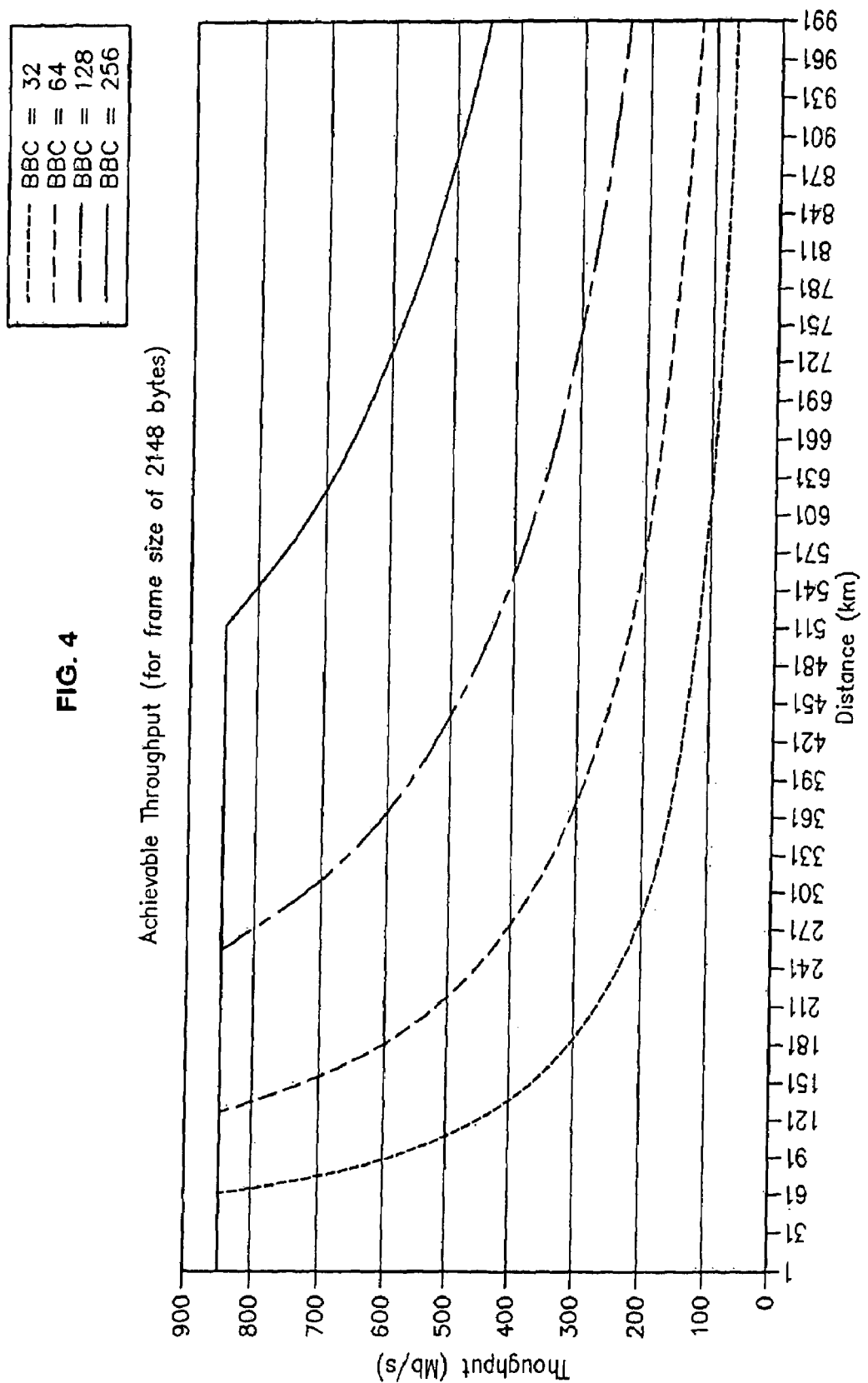
FIG. 4 is a graphical representation of the achievable data throughput as a function of channel length and a second set of buffer to buffer credits for a conventional Fiber Channel network.
Figure 5:
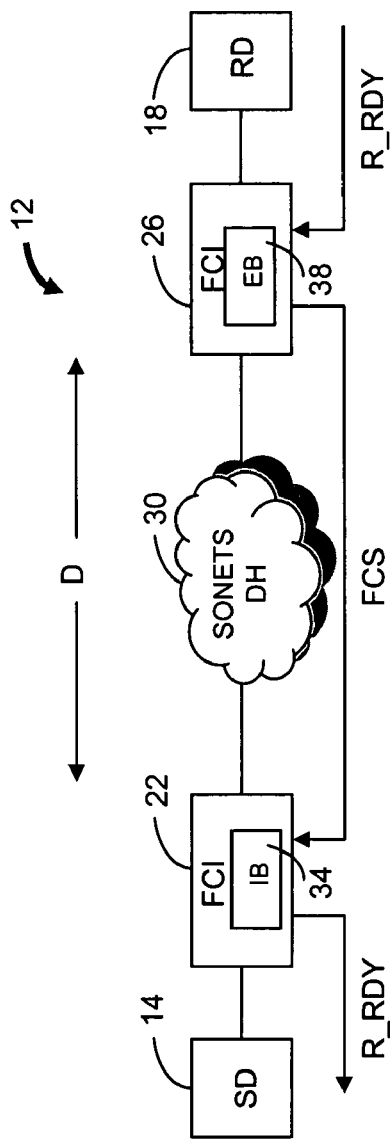
FIG. 5 is a block diagram illustrating an embodiment of a Fiber Channel communication channel in accordance with the present invention.

FIG. 5 is a block diagram of a Fiber Channel data communication channel 12 constructed in accordance with the principles of the present invention. The data communication channel 12 includes a sending device (SD) 14, a receiving device (RD) 18, an ingress flow control interception device (FCI) 22, an egress FCI 26, and an intervening SONET/SDH network 30. The sending and receiving devices 14, 18 can be, for example, communication switches, SAN switches, storage devices (e.g., disk arrays) and servers. The sending device 14 and the receiving device 18 are coupled to the data communication channel 12 at a sending device port and a receiving device port, respectively. It should be understood hereafter that a port is a node in the communication channel 12 at which data is provided for transmission to another node on the channel and/or a node in the communication channel 12 at which data transmitted from another node is received. The separation between the sending device 14 and the ingress FCI 22 and the separation between the receiving device 18 and the egress FCI 26 are small relative to the channel length (designated D). The ingress FCI 22 includes an ingress buffer 34 and the egress FCI device 26 includes an egress buffer 38.

In operation, the sending device 14 transmits a data frame 16 to the ingress FCI 22. If the ingress FCI 22 does not receive a flow control signal (FCS) transmitted across the network 30 from the egress FCI 26, the ingress FCI 22 transmits the frame 16 across the network 30 to the egress FCI 26 and sends an R_RDY signal to the sending device 14. However, if the ingress FCI 22 receives a flow control signal, the frame 16 is stored in the ingress buffer 34 and no R_RDY signal is sent to the sending device 14. When the flow control signal is no longer received or is deactivated, the frame 16 is "released" from the ingress buffer 34 and transmitted across the network 30 to the egress FCI 26.

If the receiving device 18 is available to process the frame 16, the egress FCI 26 transmits the received frame 16 to the receiving device 18. In particular, if the difference of BBC and BBC_Credit_CNT at the egress FCI 26 is greater than zero, the frame 16 is transmitted to the receiving device 18. However, if the BBC_Credit_CNT equals the BBC, the frame 16 is stored in the egress buffer 38. The receiving device 18 provides an R_RDY signal to FCI 26 to decrement BBC_Credit_CNT and "release" the data frame when the receiving device 18 can accommodate the frame 16.

If the data held in the egress buffer 38 of the egress FCI 26 exceeds a first predetermined quantity of data, the egress FCI 26 transmits a flow control signal to the ingress FCI 22. As described above, the ingress FCI 22 does not transmit frames 16 across the network 30 if it receives a flow control signal. When the amount of data in the egress buffer 38 decreases to less than a second predetermined value, the egress FCI 26 stops sending the flow control signal. Consequently, the ingress FCI 22 can resume transmission of frames 16 across the network 30.

In one embodiment, flow control is implemented as a repetitive transmission of a flow control signal. More specifically, a flow control signal in a first state is transmitted by the egress FCI 26 to the ingress FCI 22 to implement flow control. The flow control signal is regularly retransmitted for the duration of the flow control. To terminate flow control, the egress FCI 26 transmits a flow control signal in a second state. Flow control signals in the second state are repeatedly transmitted until flow control is again required.

In another embodiment, flow control is implemented by a flow control signal that implements a safety mechanism in the form of a pause timer transmitted from the egress FCI 26 to the ingress FCI 22. The pause timer includes a value that indicates the length of time during which flow control remains active. Flow control is deactivated, or terminated, upon receipt of a zero pause timer (i.e., a pause timer having a value of zero). Alternatively, flow control is deactivated at the expiration of the pause timer. Thus, if flow control is to be deactivated but the ingress FCI 22 does not receive the zero pause timer, data transmission resumes upon expiration of the time indicated in the last non-zero pause timer.

Advantageously, the FCIs 22, 26 are virtually transparent to the sending and receiving devices 14, 18 and have no adverse effect on other network hardware. The FCIs 22, 26 ensure a known data throughput over a specified channel length with appropriately sized buffers 34, 38. In addition, the FCIs 22, 26 can extend the reach, or distance, for high data rate communications and can accommodate subrate communications (i.e., communications at less than the Fiber Channel data rate) across the network 30.

The capacity of the ingress buffer 34 should be sufficient to accommodate a maximum BBC value i.e., a maximum anticipated number of outstanding frames 16. For example, if the maximum BBC for the data communication channel 12 is 60 and the frames size is 2,148 bytes, the size of the ingress buffer 38 is at least 126 Kbytes.

The size of the egress buffer 38 is dependent on the distance D between the FCIs 22, 26. If a flow control signal is used, the egress buffer 38 requires enough capacity to store data that can be transmitted during a period that is four times the time required to transmit a signal between the FCIs 22, 26. This period includes a first interval that can contain all "outstanding" data (i.e., data transmitted by the ingress FCI 22) that are (1) in transit (i.e., "between" the two FCIs 22, 26) when the flow control signal exits the egress FCI 26 and (2) transmitted by the ingress FCI 22 during the time after the flow control signal exits the egress FCI 26 but before the flow control signal is received at the ingress FCI 22. This first interval is necessary to ensure that no data is lost. In addition, this period includes a second interval that can contain data that could potentially be transmitted by the ingress FCI 22 which (1) would be in transit when flow control is deactivated and (2) would be transmitted while the deactivation signal propagates to the ingress FCI 22. Without the second period, the buffer may empty before the newly transmitted data arrive at the egress buffer 38, thus reducing the efficiency of the communication link 12. Depending on the specific application, it can be possible to optimize the buffer size to a value corresponding to more than twice but less than four times the separation D.

In one embodiment of a Fiber Channel data communication channel according to the present invention, the R_RDY signals are intercepted but flow control signals are not implemented. This embodiment is effective if the receiving device 18 does not experience congestion or if the egress buffer 38 in the egress FCI 26 does not overflow. The R_RDY signals control the transmission of the data across the network 30. Consequently, data can be transferred at a subrate and the reach of the data communication channel 12 is increased.

In another embodiment of a Fiber Channel data communication channel in accordance with the present invention, the R_RDY signals are not intercepted and no flow control signals are used. Consequently, the reach of the communication channel 12 is not extended. If the sending device 14 provides data at a rate that exceeds the network data rate, the R_RDY signals generated by the receiving device 18 act to slow down the data transfer (i.e., transfer at a subrate). The ingress buffer 34 of the ingress FCI 22 is sized to accept any data that may accumulate while awaiting transmission across the network 30. In this embodiment, the egress buffer is not required as the R_RDY signals are provided directly from the receiving device 18 to the ingress FCI 22.

Although the embodiment shown in FIG. 5 describes data transmission in a single direction, it should be understood by one of skill in the art that the principles described above apply to data transmission in both directions. For example, a device capable of sending and receiving frames can replace each device 14, 18 in the illustrated embodiment. In this alternative embodiment, the ingress FCI 22 and egress FCI 26 are replaced by a single FCI that manages data to be transmitted across the network 30 and received from the network 30. Moreover, the invention is not limited to SONET/SDH networks but can be applied to other types of communications network implementing Fiber Channel, including LANs and wide area networks (WANs). In one embodiment, a pair of FCIs 22, 26 is included for each channel of a plurality of channels in a network. In another embodiment, a single bidirectional FCI is included for each of a plurality of channels in a network.

Figure 6:
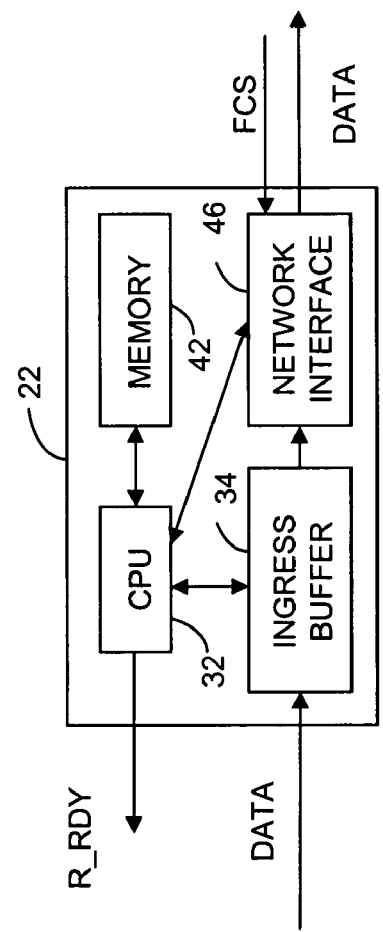
FIG. 6 is a block diagram of an embodiment of a sending flow control interception device of the present invention.
Figure 7:
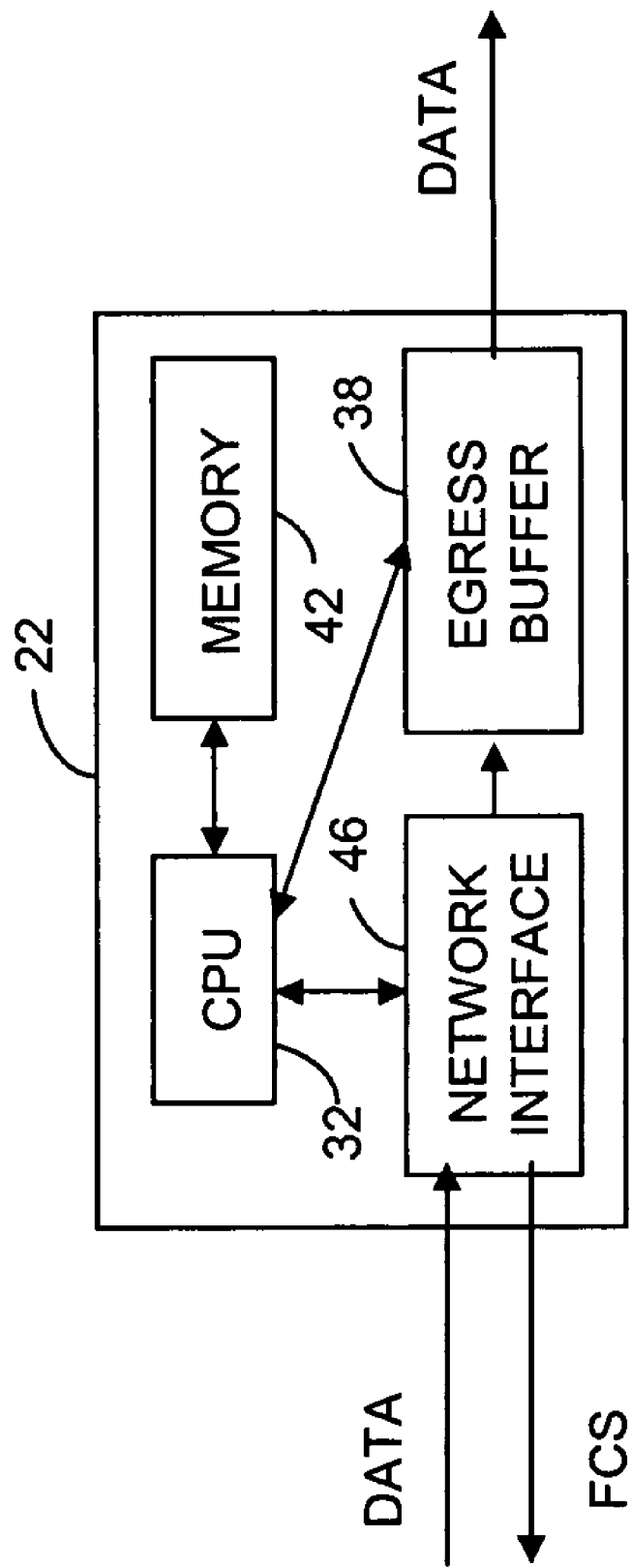
FIG. 7 is a block diagram of an embodiment of a receiving flow control interception device of the present invention.

FIG. 6 and FIG. 7 depict the ingress FCI 22 and the egress FCI 26, respectively, of FIG. 5. Each FCI 22, 26 includes one or more central processing units (CPUs) 32 (e.g., microcontrollers, programmable gate arrays (PGAs) and field programmable gate arrays (FPGAs)) which execute programmatic code to perform their functions described above. The programmatic code is implemented in any programming language suitable for compilation and execution on the FCIs 22, 26, such as C++, Verilog. Each of the FCIs 22, 26 further includes one or more memory storage units 42 to store the executable code and includes one or more network interfaces 46, controlled by the CPU 32, for coupling the FCIs 22, 26 to the network 30, thereby facilitating the transmission and reception of data to and from other devices.

Figure 8:
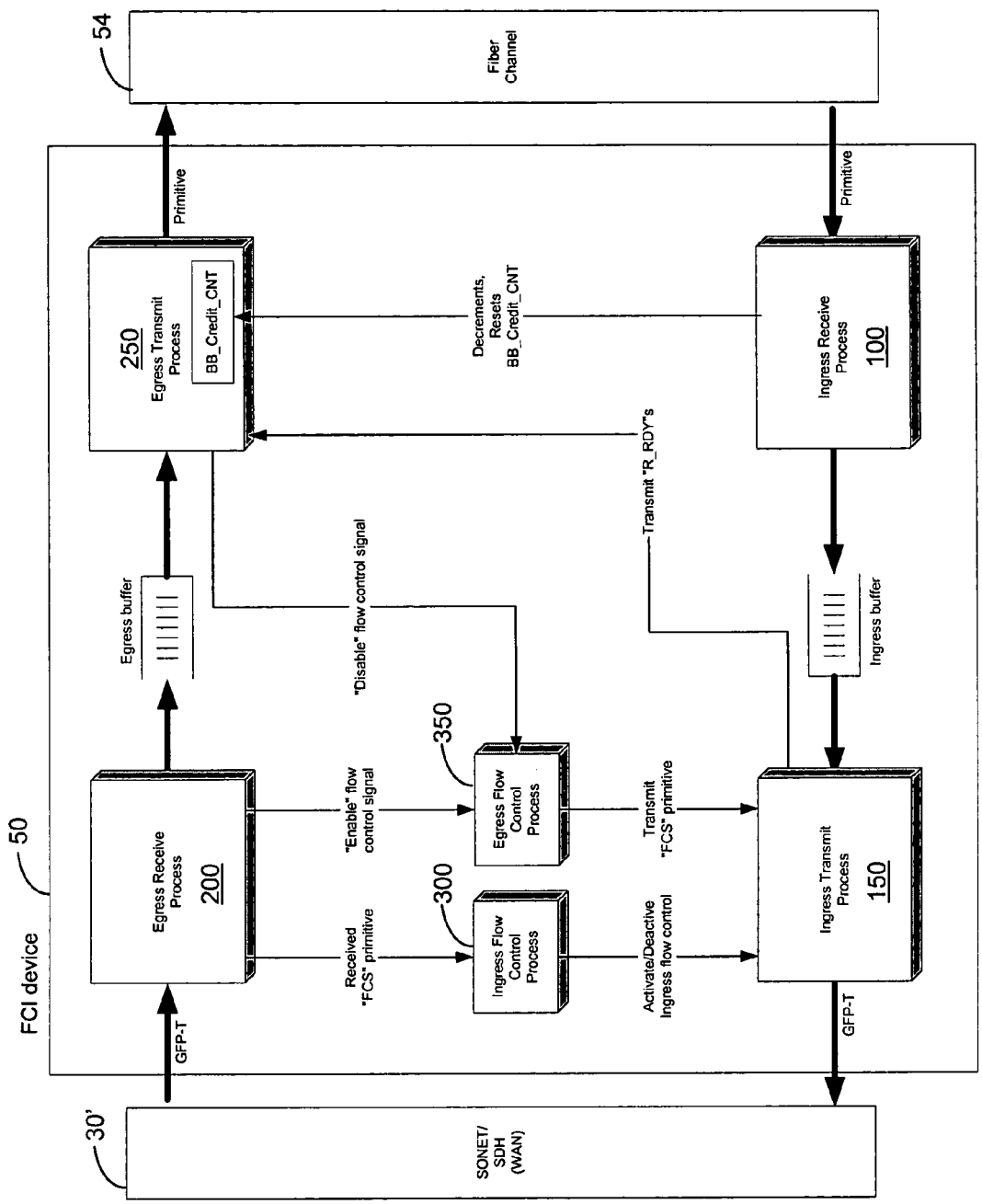
FIG. 8 is a flow diagram illustrating processes implemented by an embodiment of a flow control interception device according to the present invention.

FIG. 8 is a block diagram illustrating processes executed by an FCI 50 managing the transfer of data between a WAN 30' and a Fiber Channel communication channel 54 in accordance with the present invention. For illustrative purposes, a transparent generic framing procedure (GFP-T) is shown although the present invention applies to other procedures, such as a frame mapped generic framing (GFP-F), a High-Level Data Link (HDLC) protocol and packet over SONET (PoS) protocol. In the GFP-T mapping procedure, block-coded client characters are decoded and mapped into a fixed length GFP frame that is transmitted immediately without waiting for the reception of an entire frame from the sending device 14.

An ingress receive process 100 provides for receiving a primitive and decrementing or resetting the BB_Credit_CNT, if necessary, in response to the received primitive. In addition, the process 100 adds the primitive (except IDLE and R_RDY primitives) to the current GFP-T frame. An ingress transmit process 150 provides for transmission of the GFP-T frames in the ingress buffer and instructs the egress transmit process 250 to transmit the associated R_RDY signals. The frames are transmitted across the WAN 30' as long as an ingress flow control is not activated in response to a received flow control signal.

An egress receive process 200 is implemented for GFP-T frames received from the WAN 30'. If a flow control signal is detected under this process 200, an ingress flow control process 300 provides for activation of ingress flow control. If it is determined in the egress receive process 200 that the egress buffer exceeds a predetermined threshold, an enable flow control signal request is provided to an egress flow control process 350 which responds by transmitting a flow control signal primitive. An egress transmit process 250 executes multiple functions, including retrieving the next primitive from the egress buffer and managing the primitives sent to the Fiber Channel device. In addition, the process 250 provides for passing a disable command to the egress flow control process 350 if the egress buffer content is less than a threshold value.

Figure 9:
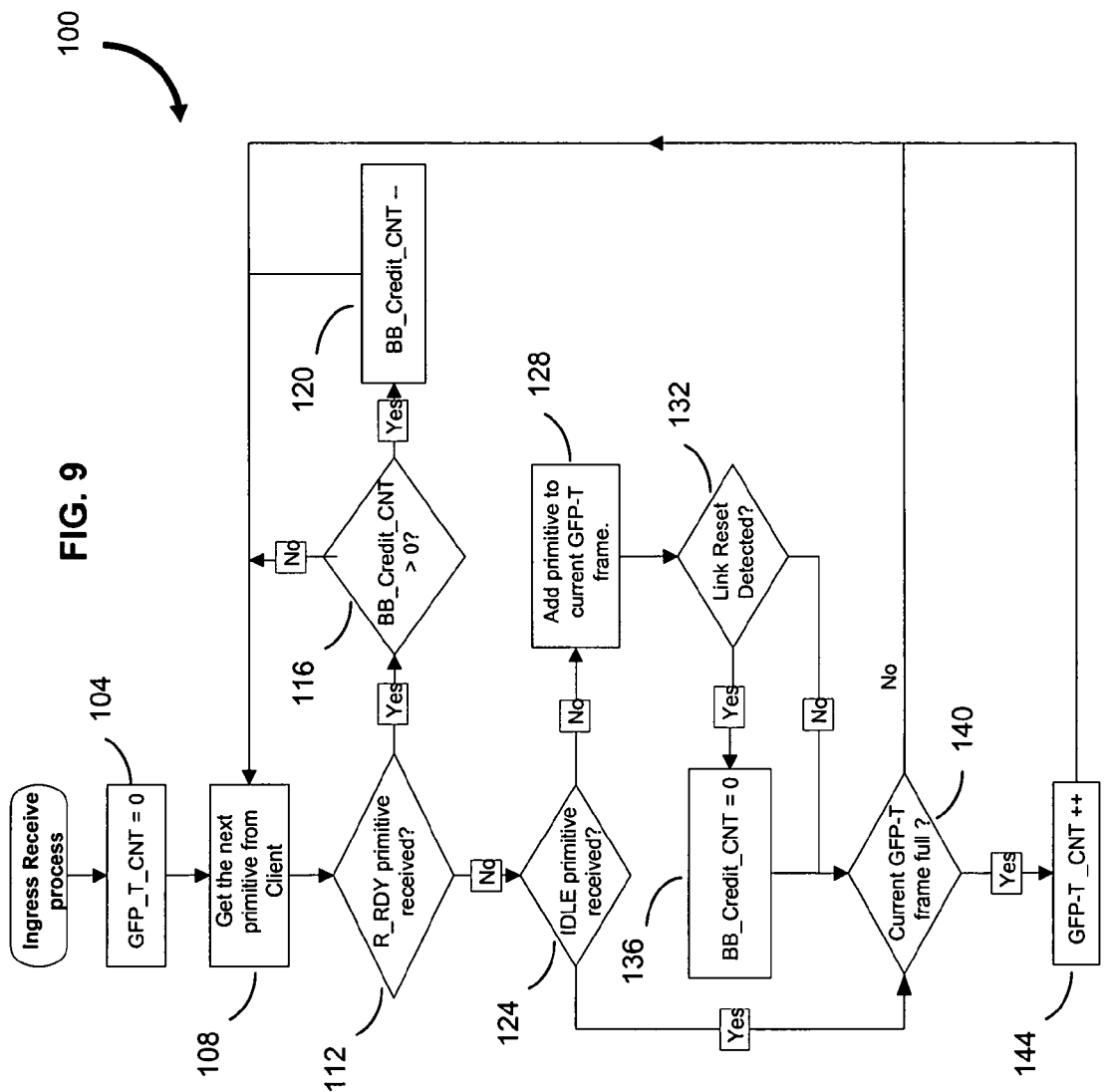
FIG. 9 is a flowchart representation of the ingress receive process of FIG. 8.

FIG. 9 is a flowchart representation of an embodiment of the ingress receive process 100 executed by the FCI 50 of FIG. 8. A GFP-T counter, GFP-T_CNT, is initialized (step 104) and the next primitive signal is received (step 108) from the client (e.g., sending device 14 of FIG. 5). A determination is made as to whether an additional frame 16 from the sending device 14 can be accommodated by determining (step 112) if an R_RDY primitive signal has been received. If an R_RDY primitive was received and if it is determined (step 116) that BB_Credit_CNT is greater than zero, BB_Credit_CNT is decremented (step 120) by one and the next primitive is retrieved (step 108) from the sending device.

If an R_RDY primitive is not received (step 112), a determination is made (step 124) as to whether an IDLE primitive has been received. If no IDLE primitive was received, the current primitive is added (step 128) to the current GFP-T frame and a determination is made (step 132) as to whether a link reset command has been detected. If a link reset was detected, BBC_Credit_CNT is initialized (step 136) at zero. If it is determined (step 140) that the current GFP-T frame is not full, the process 100 returns to step 108 to retrieve the next primitive from the client. However, if the current frame is full, the GFP-T counter is incremented (step 144) by one before the process 100 returns to step 108. In the event that the process 100 returns to step 108 and the next primitive (except for IDLE primitives) is not received within a predetermined time, the current GFP-T frame is transmitted even though the data frame is not full. For example, the predetermined time can be the time required to receive data sufficient to fill a frame. This precaution prevents undue delay in transmission of the current frame.

Figure 10:
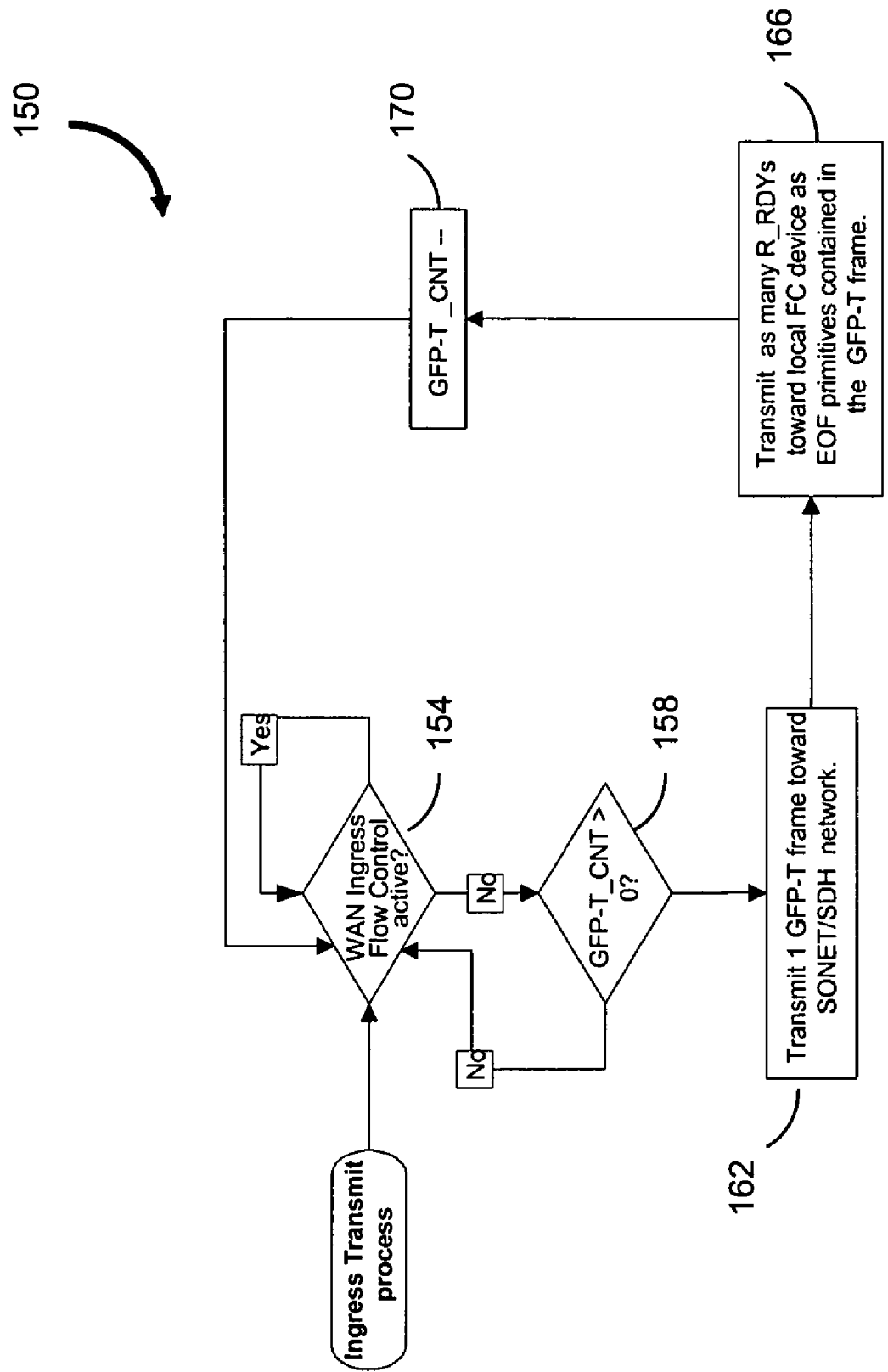
FIG. 10 is a flowchart representation of the ingress transmit process of FIG. 8.

FIG. 10 is a flowchart representation of the ingress transmit process 150 executed by the FCI 50 of FIG. 8. As described above, a GFP-T framing procedure is utilized. A determination is made (step 154) as to whether a flow control signal is received (i.e., whether ingress flow control is active). If ingress flow control is active, the process 150 remains at step 154 until the flow control is deactivated. When flow control is not active, a determination is made (step 158) as to whether there are any frames available to transmit. If no frames are available, the process 150 returns to step 154. If one or more frames are available, a GFP-T frame is transmitted (step 162) to the SONET/SDH network. One or more R_RDY signals are then transmitted (step 166) to the client. In general, the number of R_RDY signals equals the number of end-of-frame (EOF) primitives included in the GFP-T frame. The GFP-T counter is then decremented (step 170) by one and the ingress transmit process 150 returns to step 154 to transmit any remaining outstanding frames.

Referring back to FIG. 8, the ingress receive process 100 and ingress transmit process 150 operate independently. More specifically, even if an activate ingress flow control signal is received from process 300, primitive signals are still added to the current frame in the ingress buffer according to process 100. However, no frames are transmitted to the network and no R_RDY signals are transmitted by process 250. The current frame is buffered when it is filled and a new GFP frame is created. The buffered frames are transmitted over the network and the appropriate number of R_RDY signals is forwarded by means of process 250 when the ingress flow control is deactivated.

Figure 11:
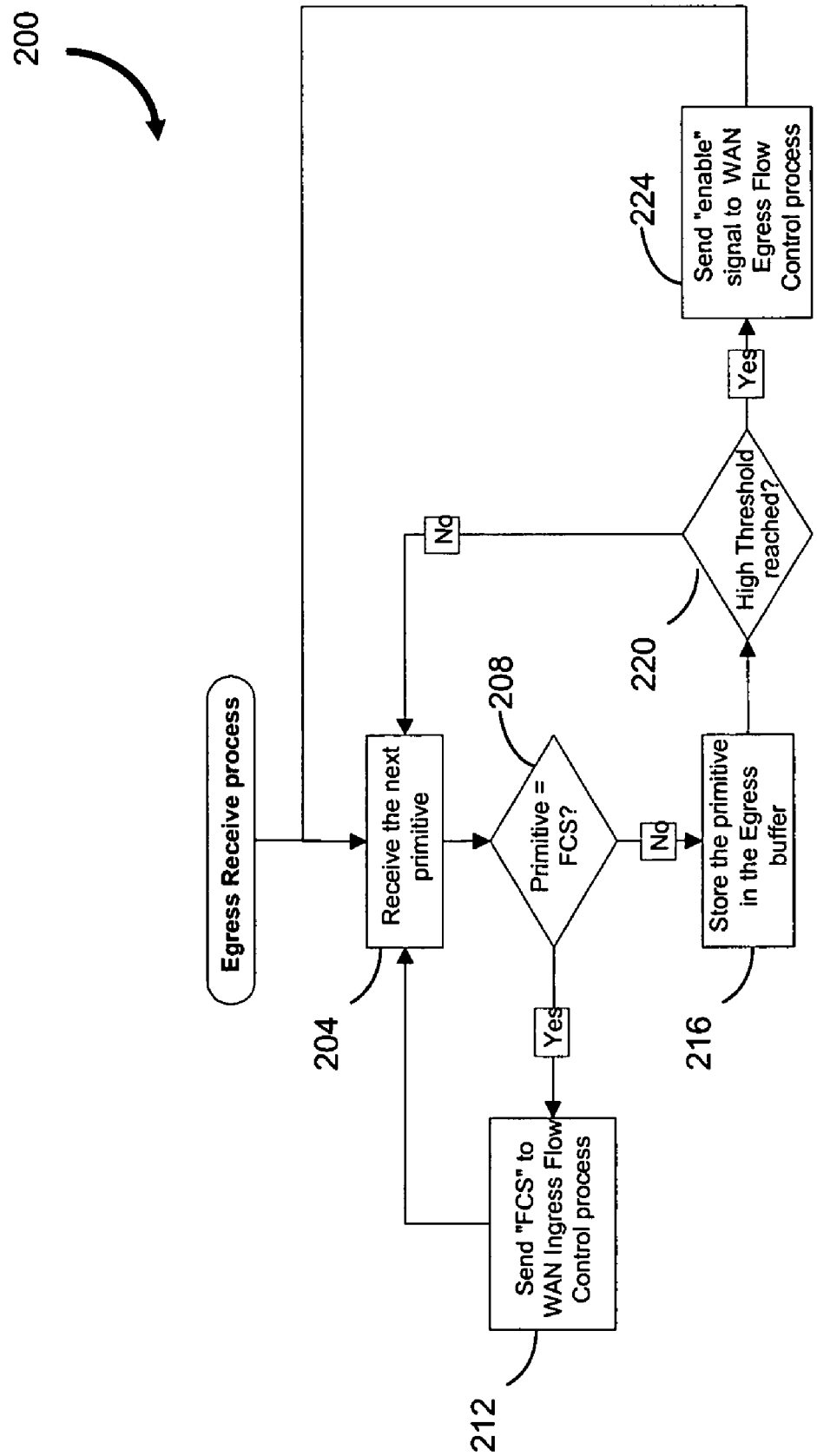
FIG. 11 is a flowchart representation of the egress receive process of FIG. 8.

FIG. 11 is a flowchart representation of an embodiment of the egress receive process 200 executed by the FCI 50 of FIG. 8. The egress receive process 200 is based on the GFP-T process described above for the ingress procedures 100, 150 of FIGS. 9 and 10. The first available primitive is received (step 204) and a determination is made (step 208) as to whether the received primitive is a flow control signal. The primitive is transmitted (step 212) to activate the ingress flow control (see FIG. 10) if it is a flow control signal, otherwise the primitive is stored (step 216) in the egress buffer 38. Primitives are continuously received and stored in the egress buffer 38 until it is determined (step 220) that the quantity of data in the buffer equals or exceeds a high threshold level. When the high threshold level is reached, an "enable" signal activates (step 224) an egress flow control process (see FIG. 13) and the process 200 continues with receipt (step 204) of the next primitive.

Figure 12:
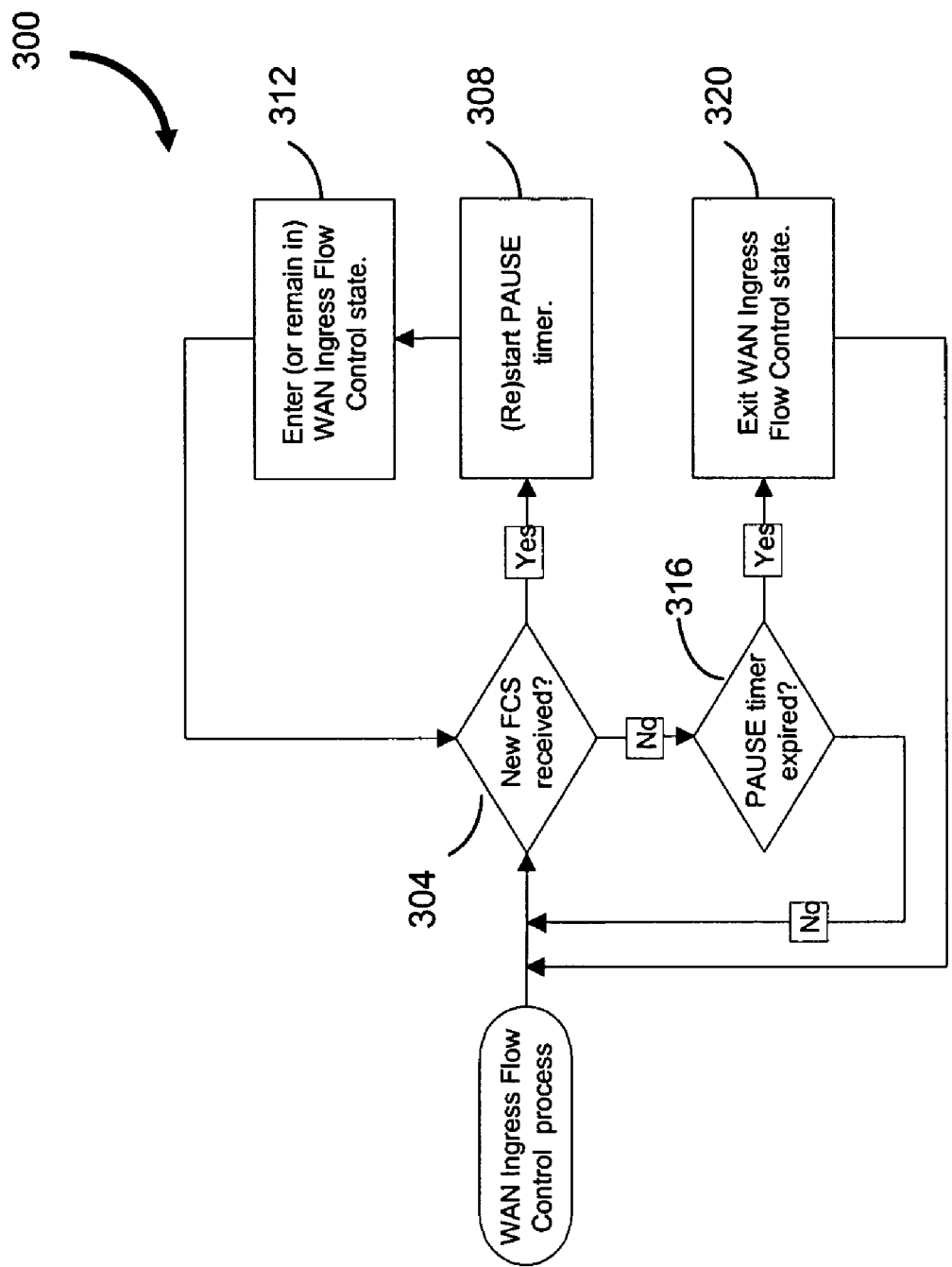
FIG. 12 is a flowchart representation of the ingress flow control process of FIG. 8.

FIG. 12 is a flowchart representation of the ingress flow control process 300 of FIG. 8. According to the process 300, if it is determined (step 304) that a flow control signal is received, a PAUSE timer is started (or restarted) (step 308) and the FCI device 50 enters (or remains in) (step 312) an ingress flow control state. If it is determined (steps 304 and 316) that no flow control signal is received and that the PAUSE timer has expired, the process 300 exits (or remains out of) (step 320) the ingress flow control state. Alternatively, if it is determined (steps 304 and 316) that no flow control signal is received but the PAUSE timer has not yet expired, the process 300 remains in the ingress flow control state.

In an alternative embodiment (not shown), the ingress flow control process 300 provides a flow control signal in a first state (i.e., asserted state) to initiate flow control. The flow control signal is repeatedly transmitted for the duration of active flow control. A flow control signal in a second state (i.e., deasserted state) is provided by the flow control process 300 to deactivate flow control. The flow control signal is repeatedly provided until flow control is again required.

Figure 13:
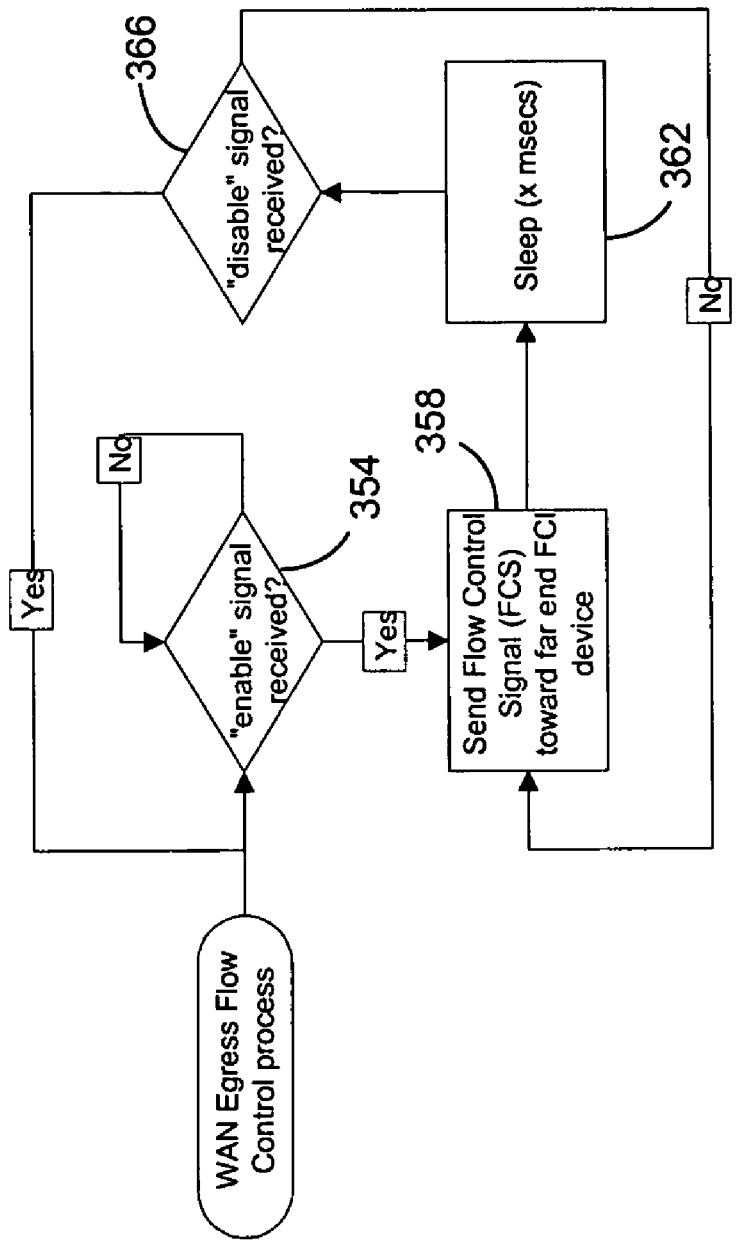
FIG. 13 is a flowchart representation of the egress flow control process of FIG. 8.

FIG. 13 is a flowchart representation of the egress flow control process 350 of FIG. 8. According to the process 350, if an enable signal is received (step 354), a flow control signal is sent (step 358) across the network 30' to the other FCI. The process 350 then pauses (or waits) (step 362) a predetermined time before determining (step 366) if a disable generated according to the egress transmit process 250 is received. If no disable signal is received, another flow control signal is transmitted (step 358) across the network 30'. If a disable signal is received, the process 350 returns to step 354 to await the next enable signal.

Figure 14:
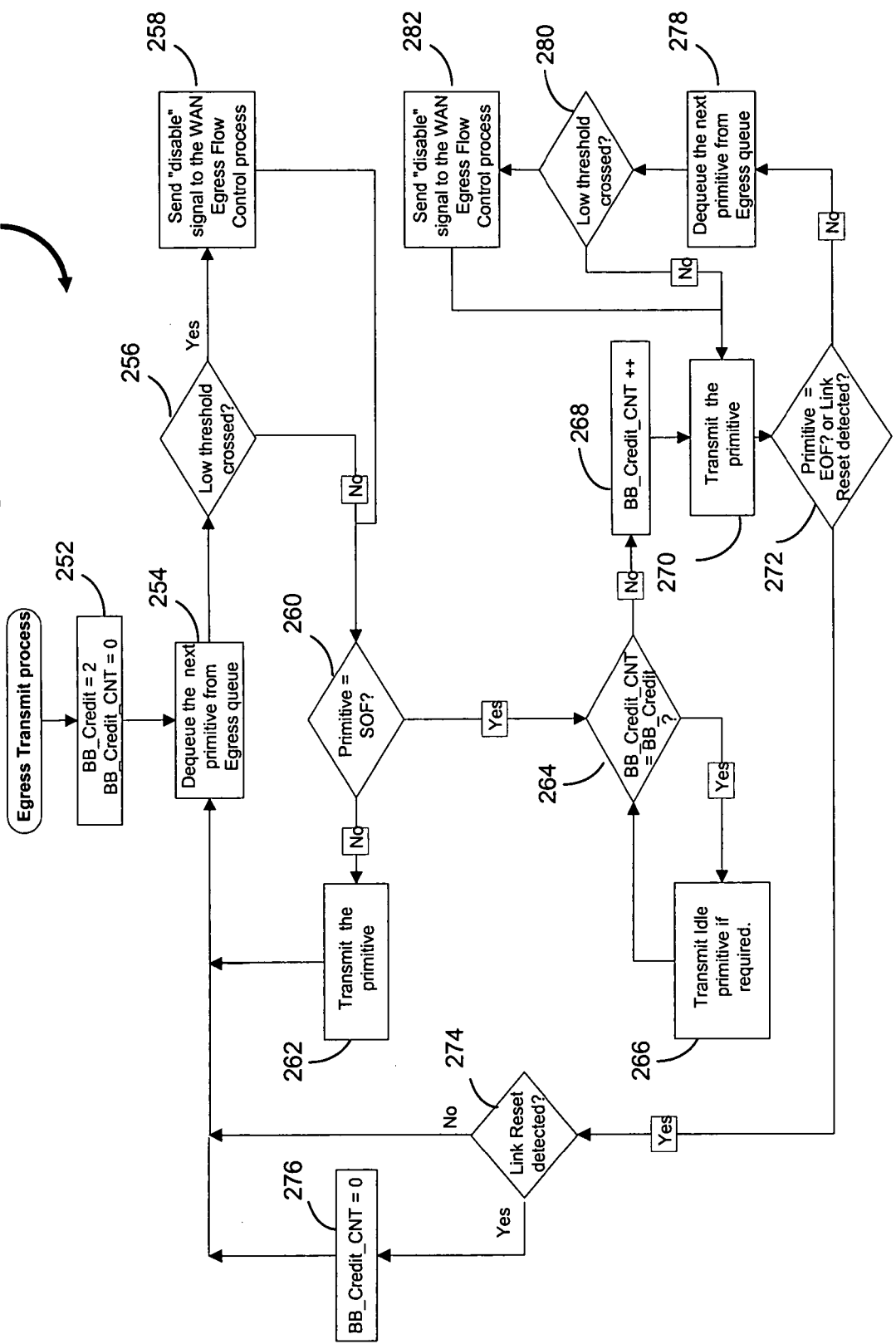
FIG. 14 is a flowchart representation of the egress transmit process of FIG. 8.

FIG. 14 is a flowchart representation of the egress transmit process 250 of FIG. 8. In the illustrative process 250, the BBC value and the BB_Credit_CNT are initialized (step 252) at two and zero, respectively, before retrieving (step 254) a primitive from the egress queue. In other embodiments, the BBC value is initialized at a different value according to the application. In one embodiment, the BBC value is user programmable to any one of a range, or group, of values. In another embodiment, the login process between the FCIs 22, 26 is monitored to determine the BBC value. If it is determined (step 256) that the buffer content has decreased to less than a low threshold value, a disable signal is sent (step 258) to the egress flow control process 350 (see FIG. 13). The egress transmit process 250 determines (step 260) if the primitive is a start-of-frame (SOF) primitive. If the primitive is not an SOF primitive, the primitive is transmitted (step 262) and the process 250 returns to step 254 to retrieve the next primitive from the egress buffer. If the primitive is an SOF and if it is determined (step 264) that the BB_Credit_CNT has increased to equal the BB_Credit value, an IDLE primitive is transmitted (step 266) and the process 250 returns to step 264. However, if the BB_Credit_CNT is less than the BB_Credit value, the BB_Credit_CNT is incremented (step 268) by one and the primitive is transmitted (step 270). At step 272, the process 250 is directed to step 274 if the primitive is an EOF or if a link reset is detected. If it is determined in step 274 that a link reset has occurred, the BB_Credit_CNT is reset (step 276) to zero before returning to step 254 to retrieve the next primitive. If no link reset is determined in step 274, the process 250 returns directly to step 254 to retrieve the next primitive. If, in step 272, the primitive is not an EOF or link reset, the process 250 proceeds to step 278 to retrieve the next primitive from the egress buffer. If it is determined (step 280) that the buffer content has decreased to less than the low threshold value, a disable signal is sent (step 282) to the egress flow control process 350 and the process 250 returns to step 270 to transmit the current primitive.

Figure 15:
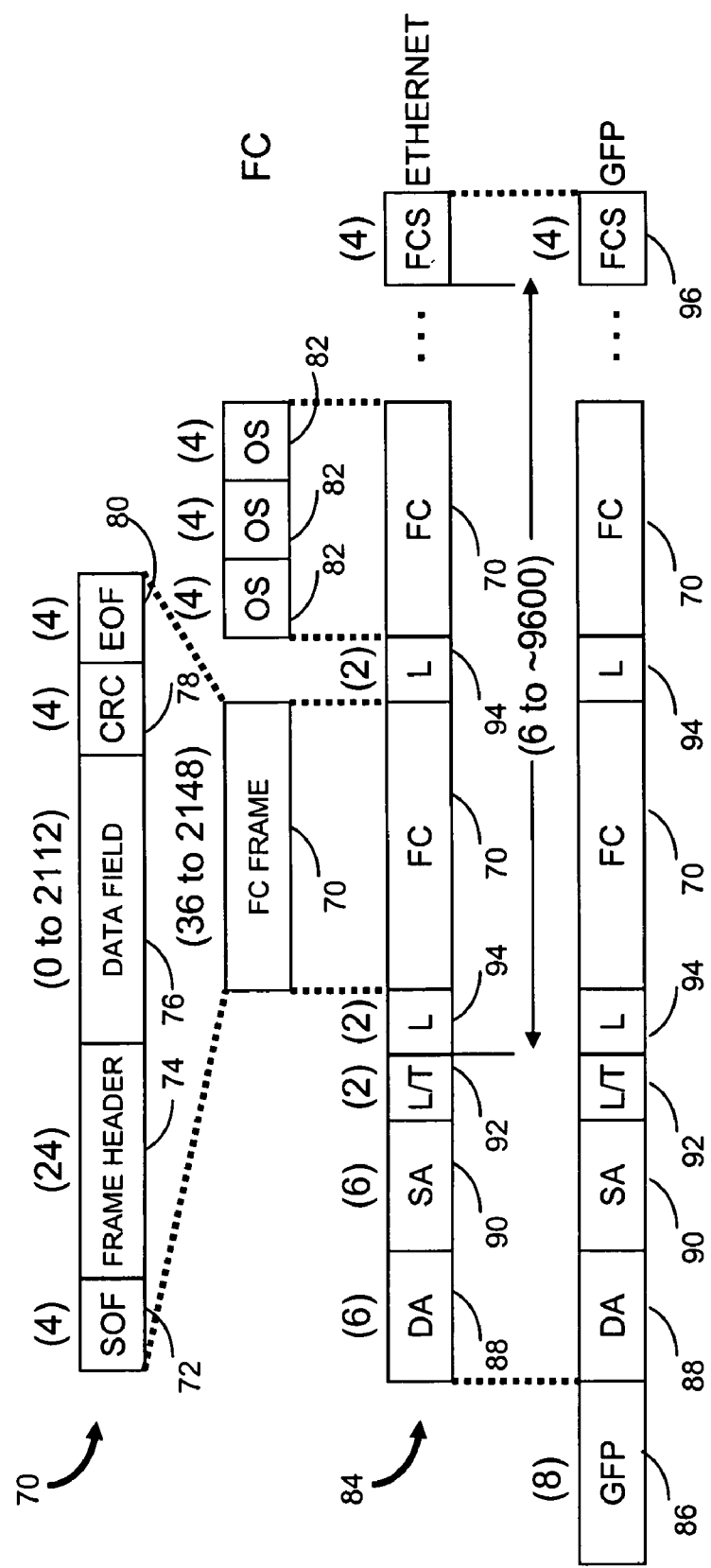
FIG. 15 is a block diagram illustrating an embodiment of an F-GFP mapping scheme according to the present invention.

FIG. 15 illustrates an embodiment of a GFP-F mapping scheme for Fiber Channel frames 70 in accordance with the principles of the invention. The numbers in parentheses indicate the number of bytes in the associated segment. A typical FC frame 70 includes a four byte start-of-frame (SOF) field 72, a frame header 74, a data field 76, a cyclical redundancy check (CRC) 78 and an end-of-file (EOF) field 80. In this example, multiple Fiber Channel frames 70 and ordered sets (OSs) 82 are packed into a single Ethernet frame 84. An eight byte field (GFP) 86 defines the type of framing procedure used. The destination and source are each represented by a 6-byte address, DA 88 and SA 90, respectfully. Two bytes L/T 92 are used to represent the length of the packet or the protocol used. Multiple Fiber Channel frames 70 are separated by a two byte field L 94 that indicates the number of bytes in the subsequent Fiber Channel frame 70 and whether the frame 70 includes a data field 76 or an ordered set 82. Ordered sets 82 typically occur in multiples of four bytes. If necessary, IDLE ordered Sets are added to the packet to make the frame 70 compliant with standard Ethernet frames (i.e., at least 64 bytes). A frame check sequence (FCS) 96 is typically included in the packet for error checking.

While the invention has been shown and described with reference to specific preferred embodiments, it should be understood by those skilled in the art that various changes in form and detail may be made therein without departing from the spirit and scope of the invention as defined by the following claims. For example, the invention can be implemented using non-optical communication technologies.

What is claimed is:

1. An ingress flow control interception device configured to forward traffic on a data communication channel extending between a sending device disposed adjacent to a first end of the data communication channel and a receiving device disposed adjacent to a second end of the data communication channel, and to participate in end-to-end flow control for the traffic on the data communication channel between the sending device and receiving device, the ingress flow control interception device comprising:

an ingress buffer configured to receive frames of the traffic transmitted by the sending device on the data communication channel, and a processor configured to execute computer program instructions to cause the received frames to be forwarded from the ingress buffer in a direction toward the second end of the data communication channel according to first end-to-end flow control signals received from the direction of the second end of the data communication channel.

2. The ingress flow control interception device of claim 1, wherein the first end-to-end flow control signals are provided by an egress flow control interception device disposed along the data communication channel.

3. The ingress flow control interception device of claim 1, wherein the data communication channel is configured to make use of credit based flow control.

4. The ingress flow control interception device of claim 3, wherein the ingress buffet has a capacity that is equal to or greater than a maximum buffer-to-buffer credit value defined between the sending device and the receiving device for the data communication channel.

5. The ingress flow control interception device of claim 3, wherein the ingress buffer has a capacity that is based on a length of the communication channel.

6. The ingress flow control interception device of claim 1, wherein the processor is farther configured to execute computer program instructions configured to transmit second end-to-end flow control signals toward the direction of the first end of the data communication channel.

7. The ingress flow control interception device of claim 1, wherein the first end-to-end flow control signals comprise pause and resume signals.

8. The ingress flow control interception device of claim 1, wherein ingress buffer is configured to receive frames formatted according to Fiber Channel, and wherein the processor is configured to encapsulate the frames using transparent generic framing procedure (GFP-T) prior to forwarding the received frames in the direction toward the second end of the data communication channel.

9. The ingress flow control interception device of claim 1, wherein ingress buffer is configured to receive frames formatted according to Fiber Channel, and wherein the processor is configured to encapsulate the frames using frame mapped generic framing procedure (GFP-F) prior to forwarding the received frames in the direction toward the second end of the data communication channel.

10. The ingress flow control interception device of claim 6, wherein the data communication channel comprises a portion of a SONET/SDH network.

11. An egress flow control interception device configured to forward traffic on a data communication channel extending between a sending device disposed adjacent to a first end of the data communication channel and a receiving device disposed adjacent to a second end of the data communication channel, and to participate in end-to-end flow control for the traffic on the data communication channel between the sending device and the receiving device, the egress flow control interception device comprising:

an egress buffer configured to receive frames of the traffic transmitted by an ingress flow control interception device on the data communication channel, and a processor configured to execute computer program instructions configured to cause the received frames to be forwarded from the egress buffer in a direction toward the receiving device according to first end-to-end flow control signals received from the receiving device, and configured to transmit second end-to-end flow control signals toward the ingress flow control interception device on the data communication channel according to a fill level of the egress buffer.

12. The egress flow control interception device of claim 11, wherein the communication channel is configured to make use of credit based flow control.

13. The egress flow control interception device of claim 12, wherein the egress buffer has a capacity that is equal to or greater than a maximum buffer-to-buffer credit value defined between the sending device and a receiving device for the data communication channel.

14. The egress flow control interception device of claim 13, wherein the egress buffer has a capacity that is based on a length of the communication channel.

15. The egress flow control interception device of claim 11, wherein egress buffer is configured to receive frames encapsulated using transparent generic framing procedure (GFP-T) and to format the frames according to Fiber Channel prior to forwarding the received frames in the direction toward the receiving device on the data communication channel.

16. The egress flow control interception device of claim 11, wherein egress buffer is configured to receive frames encapsulated using frame mapped generic framing procedure (GFP-F) and to format the frames according to Fiber Channel prior to forwarding the received frames in the direction toward the receiving device on the data communication channel.

17. The egress flow control interception device of claim 11, wherein the data communication channel comprises a portion of a SONET/SDH network.

18. The egress flow control interception device of claim 11, wherein the second end-to-end flow control signals comprise pause and resume signals.

19. A method of controlling the flow of data communications at a flow control interception point disposed along a data communication channel extending in a first direction toward a first device disposed adjacent to a first end of the data communication channel and in a second direction toward a second device disposed adjacent to a second end of the data communication channel, the method comprising the steps of:

receiving, at a first butter on the flow control interception point, first frames from the first direction on the data communication channel; and forwarding, by the flow control interception point, the first frames from the first buffer in the second direction on the data communication channel according to second end-to-end flow control signals received by the flow control interception point from the second direction on the data communication channel.

20. The method of claim 19, further comprising the steps of:

receiving, at a second buffer on the flow control interception point, second frames from the second direction on the data communication channel; and forwarding, by the flow control interception point, the second frames from the second buffer in the first direction on the data communication channel according to first end-to-end flow control signals received by the flow control interception point from the first direction on the data communication channel.

21. The method of claim 20, further comprising the steps of:

receiving, by the flow control interception point, the second end-to-end flow control signals; and receiving, by the flow control interception point the first end-to-end flow control signals.

22. The method of claim 21, further comprising the steps of:

generating, by the flow control interception point, third end-to-end flow control signals and transmitting the third end-to-end flow control signals in the first direction; and generating, by the flow control interception point, fourth end-to-end flow control signals and transmitting the fourth end-to-end flow control signals in the second direction.

* * * * *

UNITED STATES PATENT AND TRADEMARK OFFICE
CERTIFICATE OF CORRECTION

| | | |
|---|---|---|
| PATENT NO. | : 7,209,445 B2 | |
| APPLICATION NO. | : 11/061405 | |
| DATED | : April 24, 2007 | |
| INVENTOR(S) | : Pierre Miller, Bernard Merchand and Marc W. Leclair | |

It is certified that error appears in the above-identified patent and that said Letters Patent is hereby corrected as shown below:

Col. 12, Claim 4, line 2, change "ingress buffet" to --ingress buffer--;
Col. 12, Claim 6, line 2, change "farther configured" to --further configured--; and
Col. 14, Claim 19, line 9, change "receiving, at a first butter" to --receiving, at a first buffer--.

Signed and Sealed this

Thirty-first Day of July, 2007

JON W. DUDAS
*Director of the United States Patent and Trademark Office*